March 10, 1953  R. C. GIBSON ET AL  2,631,017
MUD AND CHEMICAL MIXER

Filed May 5, 1947  3 Sheets-Sheet 1

INVENTORS
Roy Clyde Gibson
BY John Joseph Leggett
Wayland D. Keith
HIS AGENT

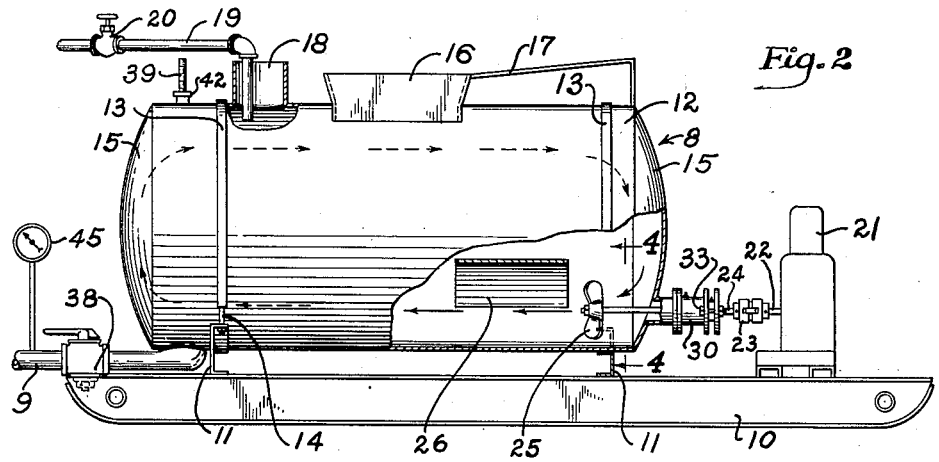
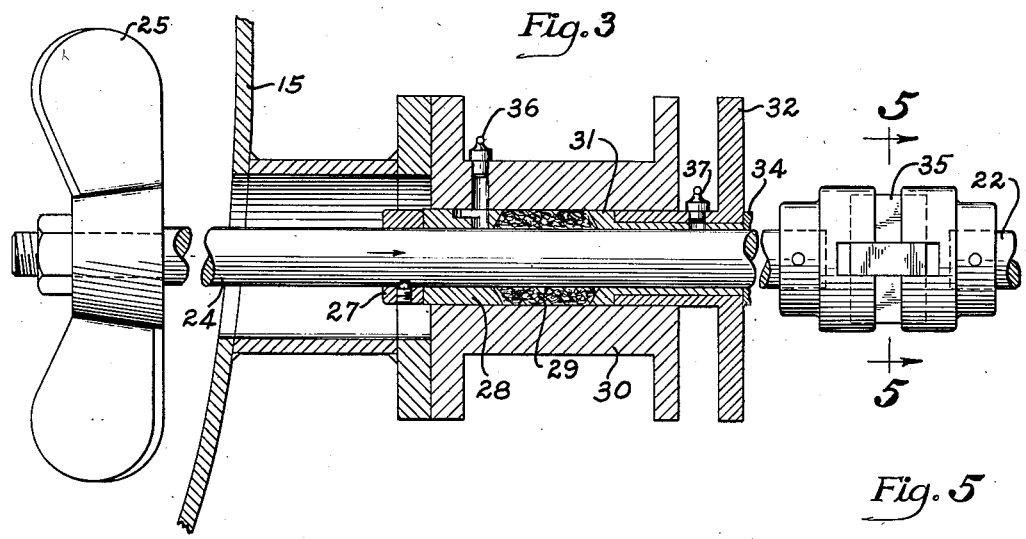
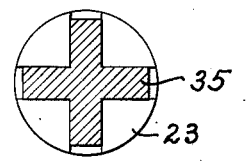
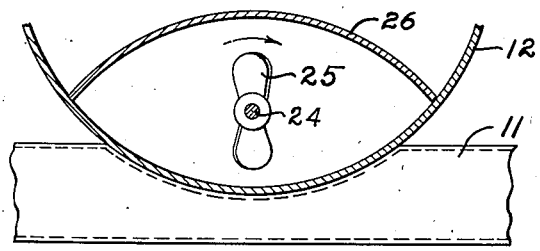

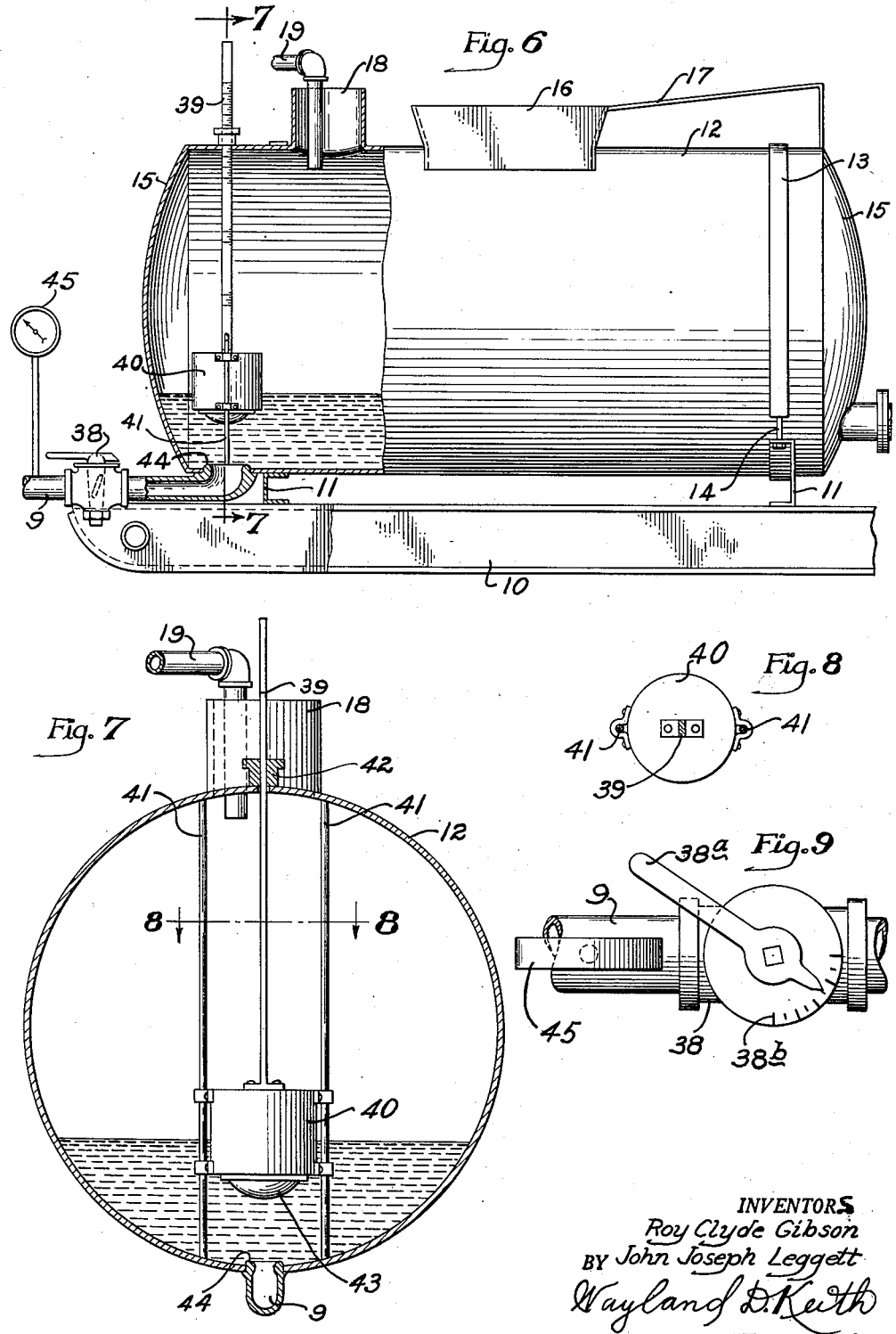

UNITED STATES PATENT OFFICE 2,631,017

MUD AND CHEMICAL MIXER

Roy Clyde Gibson and John Joseph Leggett,
Wichita Falls, Tex.

Application May 5, 1947, Serial No. 746,082

1 Claim. (Cl. 259—97)

This invention relates to improvements in mud and chemical mixers, particularly for use in connection with rotary drilling rigs to supply a quantity of mud or chemically treated mud thereto.

It has been the usual practice heretofore to use the mud found in the locality in which the well is being drilled as the incompressible circulating media that is pumped down into the well for sealing off the fluids within the strata being drilled, and for sealing the walls of the well against loss of liquid content of the drilling fluid which would ordinarily pass into the porous strata that is being drilled. This circulating mud, under pressure, forms a wall for the well that will sustain itself and that will prevent the passage of fluids through the wall thus formed during the drilling of the well.

It has been found in some localities, especially where sandy formation exists, that such mud is not suitable for use as a drilling fluid. Furthermore, it has been found that bentonite clay possesses desirable properties for producing a mud of high viscosity and of a desirable density and which also possesses certain gel or expansive properties when mixed with certain liquids, which makes it desirable for use in producing a mud that is effective for use in sealing the walls of drilling wells to prevent loss of liquid content of drilling mud into the strata, or the infiltration of foreign fluids into the circulating media. It has been found that bentonite clay forms an effective seal, in most instances, against the entrance of salt water and high pressure gas, for filling voids in the formation, and for retaining the liquid content in the circulating media, and for various other purposes that are especially desirable for ordinary well drilling. It has heretofore been difficult to mix this mud from such clay and water into drilling fluid of even consistency and which may be introduced in proportionate quantities into the suction line of the pump leading to the well.

The usual practice used heretofore, has been to mix the mud in the conventional earth pit by the utilization of a jetting process, which however, requires that the drilling operation be stopped while the mixing is being done, so as to use the rotary rig pump to circulate and agitate the mud within the pit until it is thoroughly mixed. Due to the density thereof, the bentonite clay may settle out from this drilling fluid before it can be directed into the well, thereby greatly reducing the effectiveness of the mud used in the drilling operation. Bentonite clay possesses certain expansive and gel properties, when thoroughly mixed with certain liquids, and the greatest benefit is derived from these qualities by extensive agitation or whipping, which causes the maximum expansion of the clay.

One object of this invention is to provide a rotary drilling apparatus for effectively mixing a clay or other suitable materials with a liquid and introducing this mixture into the drilling fluid system in an amount proportionate to the drilling fluid circulated therein.

Another object of the invention is to improve the construction of mud and chemical mixers whereby a clay or chemicals may be mixed with water or other liquid in a continuous manner and be discharged from the mixer in a fixed proportion to a drilling fluid used in a rotary well drilling operation, and which mixer will be effective, not only for mixing the clay or chemical with water or other liquid, but also for maintaining the mud in the proper consistency for use.

Still another object of the invention is to improve the construction of a mixer of this character by the circulation of the material within the mixer chamber in a continuous path, as by means of a directed path for the liquid through a tunnel under applied pressure.

Another object of the invention is to provide in a mixer for the recirculation of the fluid by propeller means operated by a shaft that projects through the wall of the chamber, with practical and effective means for packing the shaft against the leakage of fluid from the chamber.

In the present invention, a separate mixer preferably is used independent of the rotary drilling pump, in which the correct amount of clay in its dry state is adapted to be mixed with water or other liquid, and the mixture is circulated and recirculated in the chamber and withdrawn therefrom by the mud pump of the rotary drilling apparatus in a proper and desired amount, and without the necessity for stopping the drilling operation during such mixing, or without the necessity of interrupting the withdrawal of mud from the mixer while adding additional clay or chemicals.

The mixer preferably utilizes a mixing tank in which is mounted a turbo-mixer driven from a suitable source of power for effectively circulating the mud within the tank not only to accomplish a thorough mixing thereof, but also to maintain the clay in suspension in the liquid and thereby form a homogeneous mass. A discharge line may be connected from the suction line of the pump of the drilling apparatus to the tank for withdrawing the mud from the tank by the force of the suction of the pump until a proper consistency and quantity of mud is obtained in the circulating system of the drilling apparatus.

The invention is shown in one embodiment in the accompanying drawings in which:

Fig. 2 is a side elevation of the mud mixer partly in section;

Fig. 3 is a detail longitudinal section through a fragmentary portion of the turbo-mixer and its drive mounting and with parts in elevation;

Fig. 4 is a detail cross section substantially on the line 4—4 of Fig. 2;

Fig. 5 is a similar view on the line 5—5 of Fig. 3;

Fig. 6 is a side elevation of a fragmentary portion of the mixer tank, partly in section, showing details of construction;

Fig. 7 is a vertical cross section therethrough on the line 7—7 of Fig. 6;

Fig. 8 is a detail transverse section on the line 8—8 of Fig. 7; and

Fig. 9 is a top plan view of the control valve.

Figure 1:
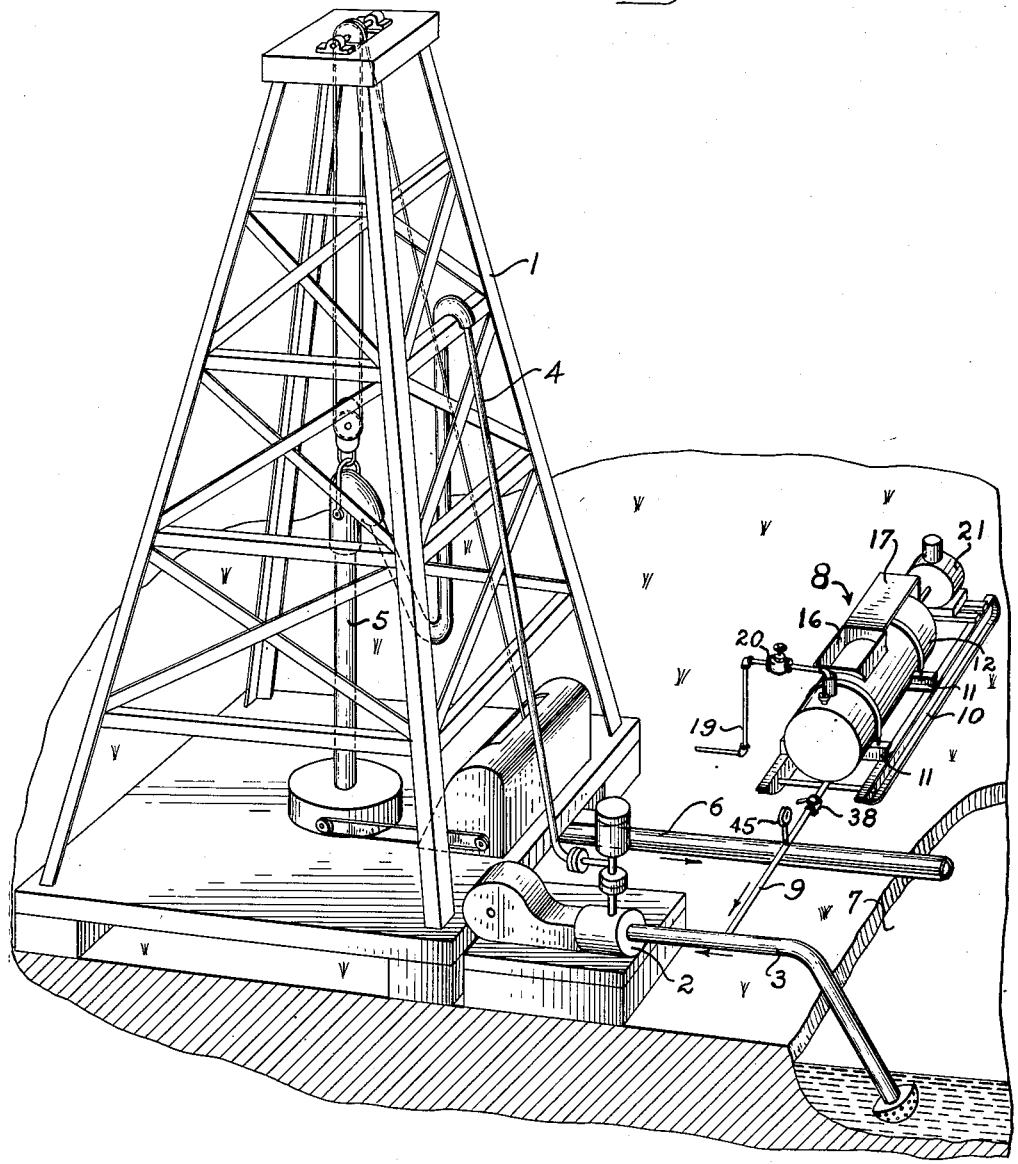
Fig. 1 is a perspective view of a rotary drilling rig showing one embodiment of the mud mixer connected therewith.

The invention is shown as applied in connection with a rotary drilling apparatus of conventional form, including a rig designated by the numeral 1. The usual mud pump 2 is provided with a suction line 3 for withdrawing mud from a suitable source such as a pit in the ground and directing the mud through a discharge line 4 that leads to a hollow Kelly-joint or drill stem generally indicated at 5. Usually the mud is pumped down through the drill stem to the bottom of the well and is discharged therefrom into the bore hole of the well, the upper end of the bore hole being connected with a mud flow pipe 6 that returns the mud to the pit, which latter is indicated in Fig. 1 by the numeral 7.

The mud mixer which forms the embodiment of this invention is designated generally by the numeral 8. This mixer is adapted to be located adjacent the rig, to be connected through a discharge pipe 9 with the suction line 3. In this way, a desired metered quantity of mud can be introduced into the suction line and directed therefrom into the drilling fluid circulating system of the well drilling apparatus. By doing this there is no loss in mud or chemicals as it is thoroughly mixed with the mud stream upon entering the circulating system and passes through the bore hole of the well before entering the pit, thereby obviating the possibility of the mud or chemical settling out into the pit until it has performed its maximum usefulness.

The mixer 8 is shown more in detail in Fig. 2. As illustrated, this mixer is constructed with a pair of skids 10 rigidly connected together by transverse support bars 11, to form a unitary skid frame. A tank 12 is mounted on this skid frame and is secured to the transverse bars 11 by straps 13 that extend transversely over the tank and are connected at their opposite ends with the transverse bars 11 by tie bolts 14.

The tank 12 is preferably cylindrical in shape, of elongated form, and is provided with dished or convex opposite heads generally indicated at 15 in Fig. 2, which heads face outward at opposite ends so as to direct the circulation of fluid therein in a continuous path extending lengthwise of the tank substantially as indicated by the arrows in Fig. 2.

The tank 12 is shown as provided with an inlet hopper 16 in the top thereof for the introduction of the chemicals or mud-forming material into the tank, such as bentonite clay and chemicals as frequently used now for the purpose. A sloping table 17 is mounted on the tank beside the hopper 16 and sloping downwardly thereto to facilitate the direction of the material into the hopper. This table may be used to support the bags of clay or other material as it is poured into the hopper.

A second opening is provided at 18 in the top portion of the tank 12 adjacent an end thereof, which opening 18 in the tank 12 is preferably diametrically opposite the mud discharge line 9, although it may be positioned at any desired point in the tank. A water inlet pipe 19 extends to the opening 18 for introducing water or other liquid into the tank under the control of a valve 20 in the pipe 19. By the introduction of water or other liquid at this point it will become intermixed with the clay or chemical before reaching the discharge pipe 9.

Mounted on the skids 10 adjacent an end of the tank 12, preferably the opposite end from that at which the discharge pipe 9 is connected, is a motor or engine 21 of any suitable character as a source of power. The motor 21 has a drive shaft 22 connected therewith, which in turn is connected through a coupling 23 with a propeller shaft 24 that extends through the adjacent end head 15 of the tank 12 and into the tank as shown in Figs. 2 and 3. The propeller shaft 24 is provided with suitable turbo-mixer means on its inner end within the tank, such as a propeller 25.

The propeller 25 is located adjacent one end of a tunnel 26 formed as an archway within the tank 12 so as to force the mud in the tank lengthwise through the tunnel in a circulating action substantially as indicated by the arrows in Fig. 2 when the propeller is operated in a corresponding direction, as for instance, in the direction indicated by the arrow in Fig. 4. This circulating and recirculating action of the mud in the tank will cause the mud to be mixed and expanded thoroughly in its flowing along the bottom of the tank and back at the upper portion thereof and recirculated through the tunnel 26 by the propeller 25, and will maintain the clay or chemical in suspension in the liquid during the circulating action.

The operation of the propeller 25 will cause an end thrust on the propeller shaft 24 in the direction of the arrow in Fig. 3. The propeller shaft 24 has a set collar 27 secured to the shaft, and which collar 27 is in bearing engagement with a packing gland 28 which surrounds the shaft 24 and confines packing 29 within a stuffing box 30 at one end of the latter. The packing 29 is confined at its opposite side by a gland 31 which is held in place by a collar 32 slidable into the stuffing box 30 as shown in Fig. 3 and connected therewith through bolts 33 which connect together flanges on the stuffing box and collar. A set collar 34 is secured to the propeller shaft 24 on the opposite side of the sleeve 32 to prevent the propeller shaft from moving in the opposite direction when the mixer is not in operation.

The packing 29 is compressed automatically by the end thrust of the propeller 25 acting upon the slidable gland 28 to slide this gland within the bore of stuffing box 30. This is permitted by the character of the coupling 23 in which two sections are spaced apart and are interconnected through a coupling member 35 that has axial sliding engagement with these coupling members. As the packing 29 wears, it will be compressed automatically until the sections of the coupling 23 are moved together. At this time, the sleeve 32 may be loosened by removing the bolts 33, to permit the removal of the gland 31, and a new packing may be inserted from the outside, after which these parts may be reapplied and connected substantially as shown in Fig. 3. The tightening of the bolts 33 will also apply axial pressure to the packing 29 in the stuffing box 30.

The stuffing box and packing may be lubricated if desired by means of lubricant fittings 36 and 37 provided thereon, through which lubricant may be introduced to the shaft 24.

A valve 38 is shown in the pipe 9 for metering the amount of mud withdrawn from the mixing tank. The remaining mud may be circulated in the tank and mixed with additional clay and water supplied thereto through the hopper 16 and opening 18 until the desired quantity has been introduced into the drilling system.

Most of the clays used to form mud have some abrasive particles contained therein which cause parts of the machinery to wear rapidly in service. To avoid the necessity for frequent repacking of the glands, a self-tightening gland 28 has been provided around the propeller shaft 24, by the action of the thrust of the propeller, which affords a uniform adjustment on the packing 29 at all times while the mixer is in operation. When this packing wears appreciably, it may be removed and replaced very simply and readily as desired. The need for replacement may be indicated by the spacing of the elements of the coupling 23. When replacement is necessary, this may be accomplished readily without the necessity for emptying the tank 12 of its contents.

Provision is made for measuring the quantity of material in the tank 12 by means of a measuring gauge rod 39 of the character shown in Figs. 6 and 7. This gauge is affixed to a float 40 slidably mounted on guide rods 41 extending vertically in the tank 12 as shown in Fig. 7, to permit the float to ride up and down on the liquid level in the tank, and to serve for the purpose of indicating the liquid level therein. The float 40 carries a graduated rod 39 thereon guided through a sleeve 42 on the top of the tank 12 and which graduated rod 39 and sleeve 42 cooperate to indicate the proper liquid level in the tank 12 according to the position of the float 40 therein.

The float 40 serves also to control the discharge of the mud from the tank by forming an automatic cut-off valve when the mud has been exhausted therefrom, thereby preventing the suction of air into the system. Thus, the bottom of the float 40 is semi-rounded or somewhat ball shaped, as indicated at 43, so as to seat upon an annular seat 44 having a convex or curved seating face which connects with the discharge pipe 9 at the bottom of the tank 12.

A control valve is shown at 38, positioned in the pipe 9, and which valve is provided with an operating handle 38a therefor which is designed to work through a 90 degree angle for completely opening or closing the valve 38 through the discharge pipe 9. A graduated dial 38b on the valve 38 cooperates with the handle 38a to indicate the position of opening or closing the valve.

The discharge pipe 9 is also shown as provided with a vacuum gauge 45 to indicate the amount of suction in the discharge pipe 9 and is connected between the valve 38 and the pump 2.

By opening the valve 38 to the desired extent, as indicated in Fig. 9, and by knowing the vacuum of gauge 45, the amount of mud or chemical introduced into the suction line 9 per hour, can be determined, either by computation or by a precomputed chart. Furthermore, the gauge rod 39 may be observed periodically to determine the drop of the liquid level in the tank, and if desired, for determining when water or other liquid and clay should be introduced, either in a batch or in a continuous manner.

The purpose of the float 40 is to give an accurate determination of the liquid level in the tank 12 to enable the correct mixing of the mud within the tank. The float 40 may also act as an automatic shut-off for the discharge line 9 leading to the well drilling rig when the tank is empty, thereby preventing the pump 2 from drawing air into the suction line of the pump 2.

The rod 39 attached to the float 40 will also serve as a valve stem for the manual opening or closing of discharge pipe 9 by seating semi-rounded valve member 43 upon seat 44. The suction of the pump 2 will hold the valve 43 in seated relation once it is seated until manually released or until the suction is released.

The operation of the turbo-mixer or propeller 25 will act to direct the mud in the circulating path generally as indicated by the arrows in Fig. 2. This path extends lengthwise in the bottom of the tank 12 through the tunnel 26, against the dished head 15 at the opposite end of the tank, which head diverts the mud upward and backward in the top portion thereof. This path of flow will cause the mud or chemically laden mud then to be directed against the head 15 at the first-mentioned end of the tank, which in turn will direct it downward to the inlet end of the tunnel 26, when the recirculating action will be repeated. This recirculating of the mud within the tank serves not only to mix thoroughly the clay or other mud-forming material or chemicals with the liquid substantially into a homogeneous mass admitting a reactionary expansion of such materials possessing such qualities, but also maintains the material in suspension so long as it is within the tank. The travel of the mud in the tank is such that the water or other liquid and clay introduced are circulated and expanded substantially throughout the tank before they reach the discharge pipe 9 through which the mud is withdrawn by the suction of the pump 2.

A proper amount of the mud may be withdrawn from the tank to maintain the consistency and quantity in the drilling fluid circulating system of the drilling apparatus as desired by the operator.

This mud mixer is comparatively small and portable so that it may be transported readily from place to place and connected to the suction line of any pump or other means for introducing mud into the drilling fluid circulating system of rotary drilling apparatus. It is efficient and effectively mixes clay or other ingredients with the drilling fluid into a mud of uniform consistency which in turn may be introduced into the suction line of the mud pump in uniform proportions.

While the invention has been illustrated and described in one embodiment, it is recognized that other variations and changes may be made there-

We claim:

In a mud mixer comprising a tank, a screw propeller mounted in said tank for circulating a liquid therein, a propeller shaft connected with the propeller and extending through the wall of the tank, a collar on said shaft, packing means surrounding the propeller shaft adjacent the wall of said tank, said shaft being so constructed as to automatically compress said packing means by said collar upon the thrust of said screw propeller shaft.

ROY CLYDE GIBSON.
JOHN JOSEPH LEGGETT.

REFERENCES CITED

The following references are of record in the file of this patent:

UNITED STATES PATENTS

| Number | Name | Date |
|---|---|---|
| 489,797 | Faber | Jan. 10, 1893 |
| 801,153 | Newton | Oct. 3, 1905 |
| 1,016,516 | Norris | Aug. 6, 1912 |
| 1,151,900 | Norris | Aug. 31, 1915 |
| 1,603,546 | Kirschbraum | Oct. 19, 1926 |
| 1,644,489 | Pitman | Oct. 4, 1927 |
| 1,876,994 | Mann | Sept. 13, 1932 |
| 2,011,646 | Moody | Aug. 20, 1935 |
| 2,016,647 | McMartin | Oct. 8, 1935 |
| 2,089,642 | Craddock | Aug. 10, 1937 |
| 2,169,675 | Bays | Aug. 15, 1939 |
| 2,283,510 | Potter | May 19, 1942 |